US012246294B2

(12) United States Patent
Alsayegh et al.

(10) Patent No.: US 12,246,294 B2
(45) Date of Patent: Mar. 11, 2025

(54) SYSTEM FOR MAKING SUSPENSIONS

(71) Applicant: KUWAIT UNIVERSITY, Safat (KW)

(72) Inventors: Naser Alsayegh, Safat (KW); Shikha A. Ebrahim, Safat (KW); Ali Alsayegh, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 574 days.

(21) Appl. No.: 17/566,631

(22) Filed: Dec. 30, 2021

(65) Prior Publication Data

US 2023/0219048 A1 Jul. 13, 2023

(51) Int. Cl.

| | |
|---|---|
| ***B01F 33/00*** | (2022.01) |
| ***B01F 23/50*** | (2022.01) |
| ***B01F 31/60*** | (2022.01) |
| ***B01F 31/86*** | (2022.01) |
| ***B01F 33/841*** | (2022.01) |
| ***B01F 35/21*** | (2022.01) |
| ***B01F 35/71*** | (2022.01) |
| ***B01F 35/92*** | (2022.01) |

(52) U.S. Cl.

CPC ............ *B01F 33/841* (2022.01); *B01F 23/50* (2022.01); *B01F 31/60* (2022.01); *B01F 31/86* (2022.01); *B01F 35/2117* (2022.01); *B01F 35/7179* (2022.01); *B01F 35/92* (2022.01)

(58) Field of Classification Search

CPC ................ B01F 33/841; B01F 35/7179; B01F 35/2117; B01F 35/92; B01F 31/60

See application file for complete search history.

(56) References Cited

U.S. PATENT DOCUMENTS 9,983,222 B2 5/2018 Peltier
2014/0082854 A1* 3/2014 Landa .................... A61K 8/494 356/402

(Continued)

FOREIGN PATENT DOCUMENTS

SU 1682855 A1 10/1991

OTHER PUBLICATIONS

Salman, Omar A. “Manufacturing Of Sterile Aqueous Suspensions: A Primer”; printed on Nov. 15, 2021 from https://www.clinicalleader.com/doc/manufacturing-of-sterile-aqueous-suspensions-a-primer-0001.

*Primary Examiner* — Anshu Bhatia
(74) *Attorney, Agent, or Firm* — Nath, Goldberg & Meyer; Joshua B. Goldberg

(57) ABSTRACT

The system for making suspensions includes a housing, with a platform mounted therein and a translating table slidably mounted on the platform for removably supporting a receptacle. A base fluid tank stores a base fluid, and a solid particle container stores solid particles. A rotating dispenser system is mounted within the housing, above the platform and the receptacle. The rotating dispenser includes a base fluid dispenser for dispensing a controlled mass of the base fluid into the receptacle, and a solid particle dispenser for dispensing a controlled mass of the solid particles into the receptacle. The base fluid dispenser is in communication with the base fluid tank, and the solid particle dispenser is in communication with the solid particle container. A mixer selectively and controllably mixes the controlled mass of the base fluid and the controlled mass of the solid particles in the receptacle to form the suspension.

16 Claims, 11 Drawing Sheets

(56) References Cited

U.S. PATENT DOCUMENTS

| | | | | |
|---|---|---|---|---|
| 2016/0144326 | A1* | 5/2016 | Boboltz | B01F 35/717613<br>222/136 |
| 2016/0202278 | A1 | 7/2016 | Peltier | |
| 2017/0151538 | A1* | 6/2017 | Balooch | B01F 35/2209 |

* cited by examiner

SYSTEM FOR MAKING SUSPENSIONS

BACKGROUND

1. Field

The disclosure of the present patent application relates to making solid-in-liquid suspensions, and particularly to an automated system for preparing suspensions.

2. Description of the Related Art

Suspensions are formed from a base fluid and a non-dissolved quantity of solid particles, typically having nano or microscale sizes. Although a wide variety of suspensions exist, common base fluids include water, ethylene glycol, etc., and typical solid nano or micro particles include copper, aluminum oxide, titanium oxide, etc. The preparation of suspensions can be performed in a number of different ways. The two-step method is the most widely used method for preparing suspensions. In this method, nano or microparticles are produced as dry powders by chemical or physical techniques. Then, the fabricated powder is dispersed into a fluid in the second processing step with the help of intensive magnetic force agitation, ultrasonic agitation, high-shear mixing, homogenizing, and/or ball milling. The two-step method is the most economic method to produce suspensions in large quantities because nano or microparticle synthesis techniques have already been scaled up to fulfill industrial production levels.

Due to the high surface area and surface activity, these particles have a tendency to aggregate. Thus, the use of surfactants is of great importance in producing physically stabilized suspensions. Due to the difficulty in preparing stable suspensions by the two-step method, several advanced techniques have been developed to produce suspensions in a one-step method. The one-step process consists of simultaneously making and dispersing the particles in the fluid. In this method, the processes of drying, storage, transportation, and dispersion of particles are avoided, so the agglomeration of particles is minimized, and the stability of suspension is increased. The one-step processes can prepare uniformly dispersed particles, and the particles can be stably suspended in the base fluid.

The vacuum submerged arc nanoparticle synthesis system (SANSS) is another efficient method to prepare suspensions using different dielectric liquids and can result in particles of several shapes. The particles prepared exhibit needle-like, polygonal, square, and circular morphological shapes. The method avoids the problem of undesired particle aggregation fairly well.

Other methods exist than those discussed above, however, no matter which method is used to prepare a suspension, the preparation of a suspension can be extremely difficult to control, particularly either by hand or on a very large scale. The preparation of suspensions is extremely sensitive to variations in mass/volume of the components, temperature, humidity, and other environmental factors. In any method of preparing suspensions, each parameter involved must be very carefully controlled, which can be extremely difficult to do, particularly when preparing suspensions in a laboratory or in a large-scale industrial process. Thus, a system for making suspensions solving the aforementioned problems is desired.

SUMMARY

The system for making suspensions is an automated system for the controlled preparation of solid-in-liquid suspensions. The system for making suspensions includes a housing which has a base, an upper wall, at least one sidewall and an open front. A platform is mounted within the housing, and a translating table is slidably mounted on the platform for removably supporting a receptacle. The translating table may be, or may include, a temperature-controlling plate for controlling a temperature of the receptacle from the receptacle's bottom end. An additional temperature-controlling jacket may be wrapped around the remainder, or a selected portion, of the receptacle. A base fluid tank is provided for storing a base fluid, and a solid particle container is provided for storing solid particles.

A rotating dispenser system is mounted within the housing, above the platform and the receptacle. The rotating dispenser includes a base fluid dispenser for selectively dispensing a controlled mass of the base fluid into the receptacle, and a solid particle dispenser for selectively dispensing a controlled mass of the solid particles into the receptacle. The base fluid dispenser is in fluid communication with the base fluid tank, and the solid particle dispenser is in communication with the solid particle container. A mixer is provided for selectively and controllably mixing the controlled mass of the base fluid and the controlled mass of the solid particles in the receptacle to form the suspension.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
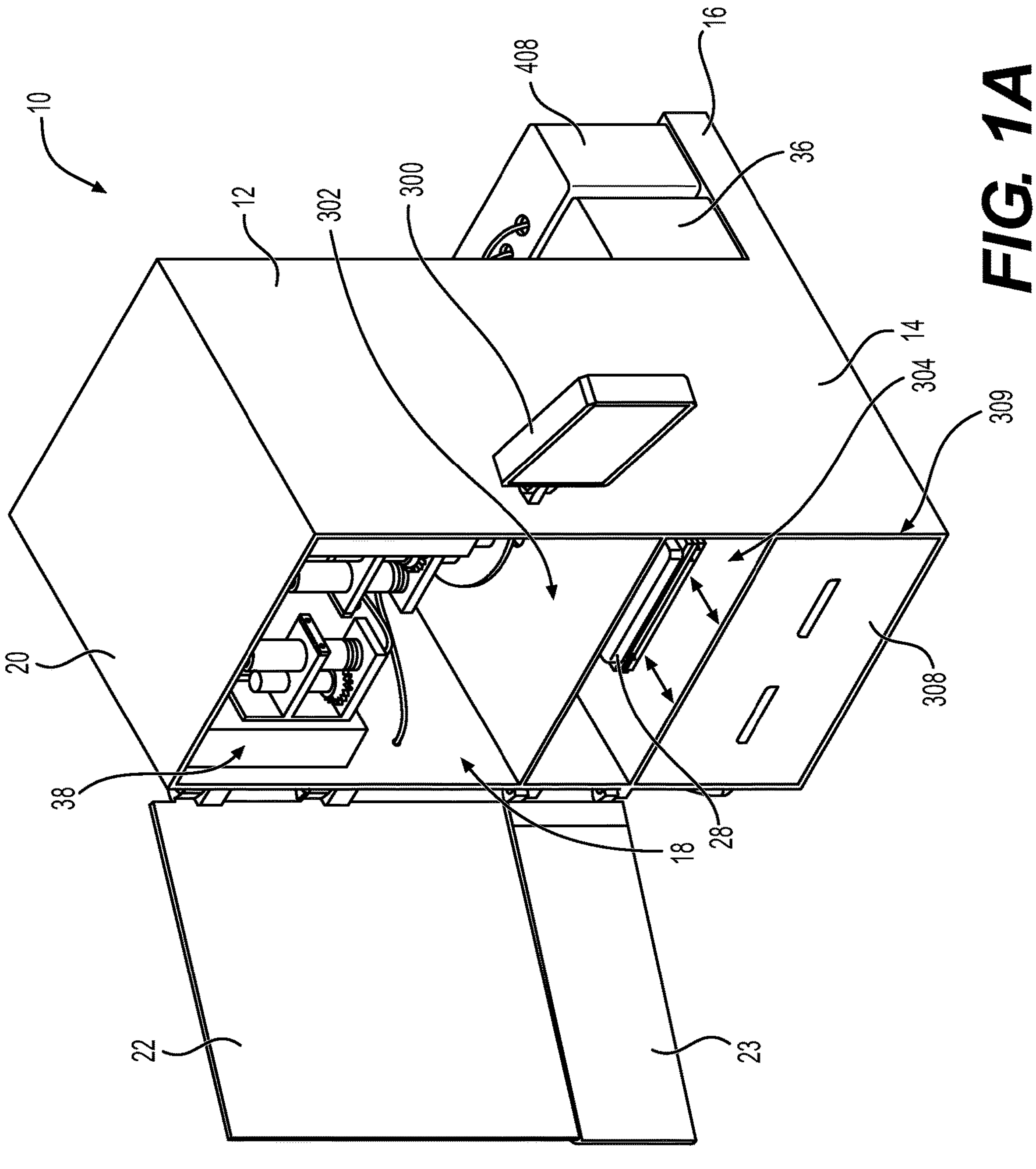
FIG. 1A is a perspective view of a system for making suspensions.
Figure 1B:
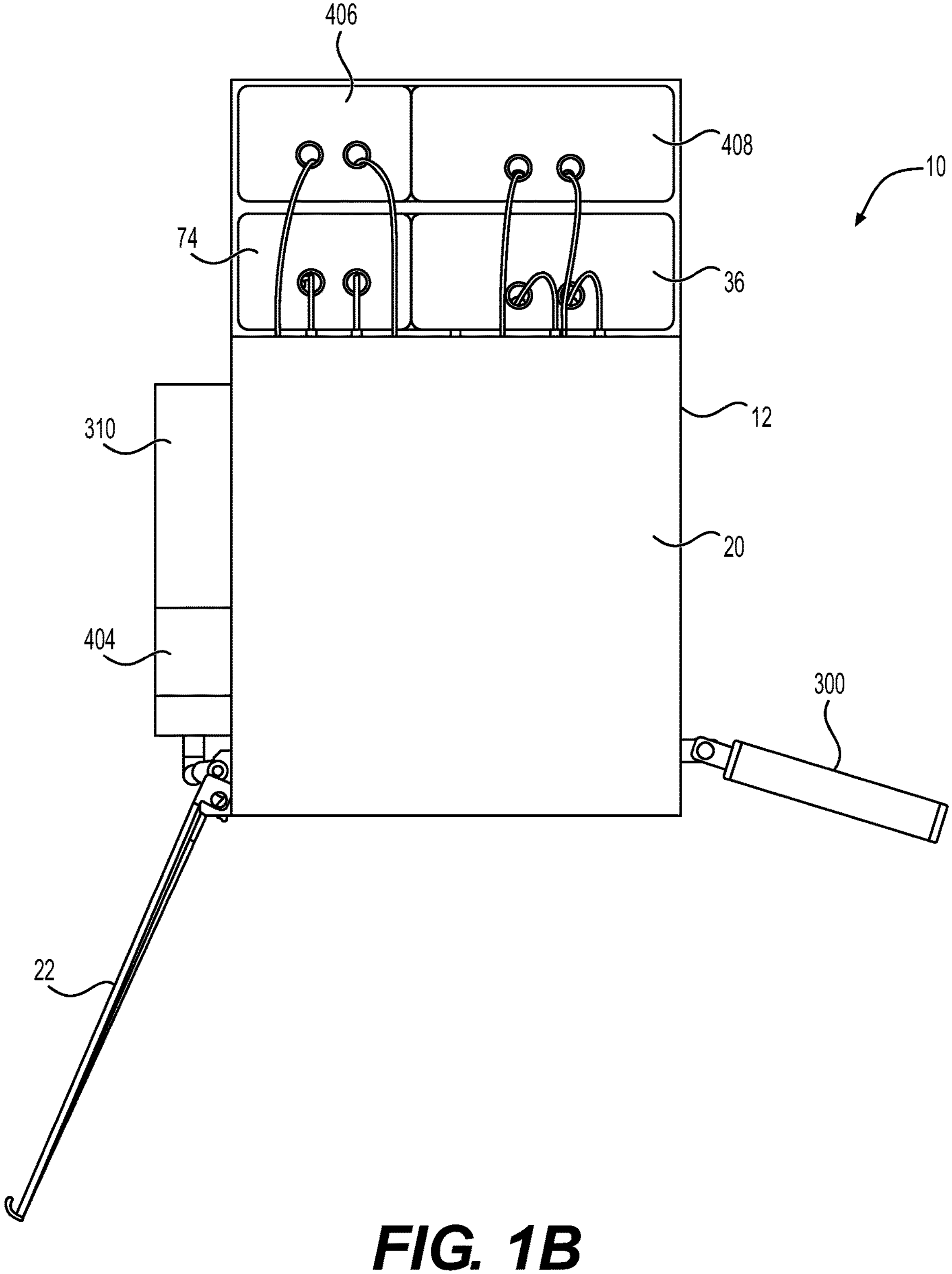
FIG. 1B is a top view of the system for making suspensions.
Figure 1C:
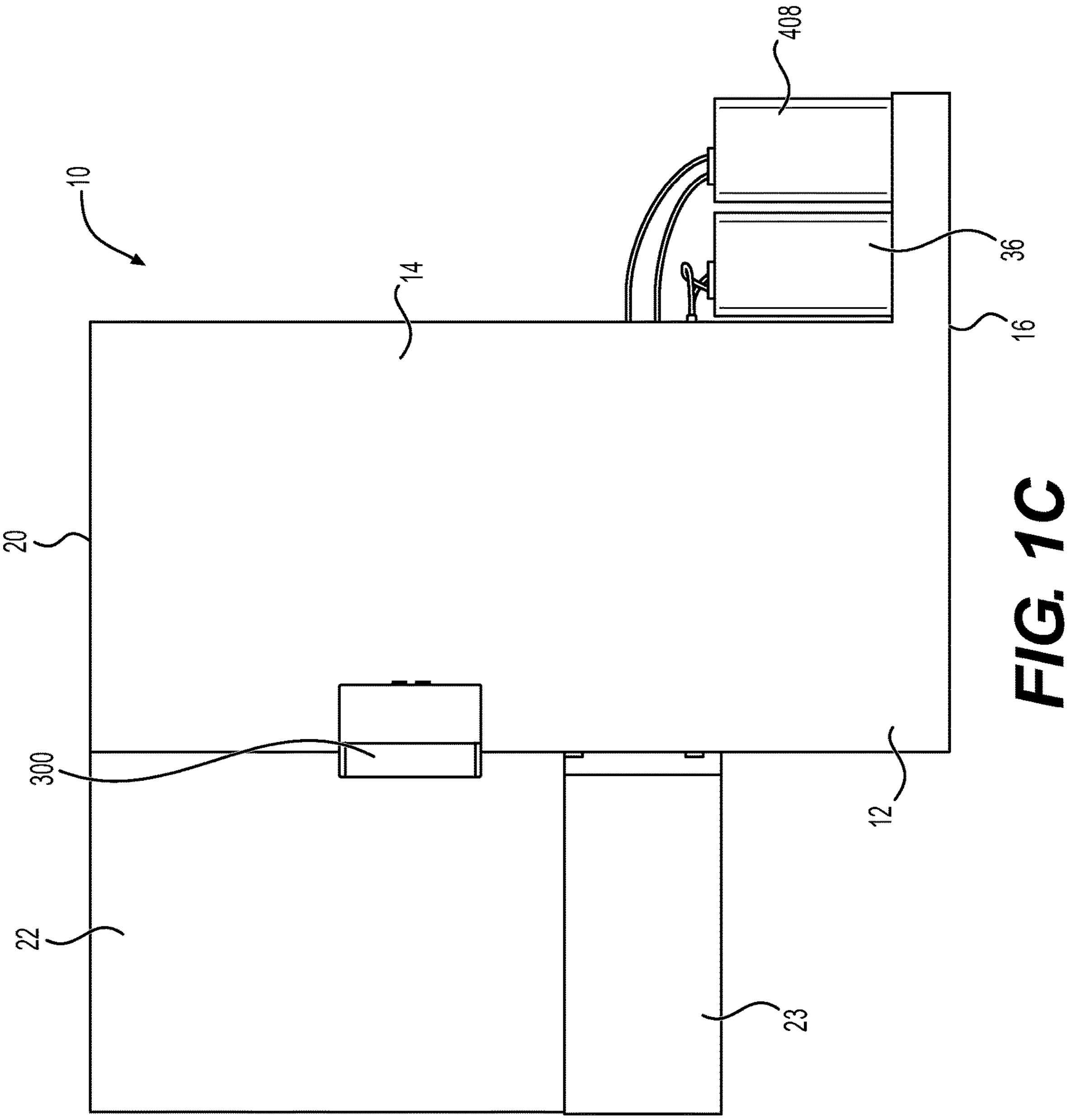
FIG. 1C is a side view of the system for making suspensions.
Figure 2:
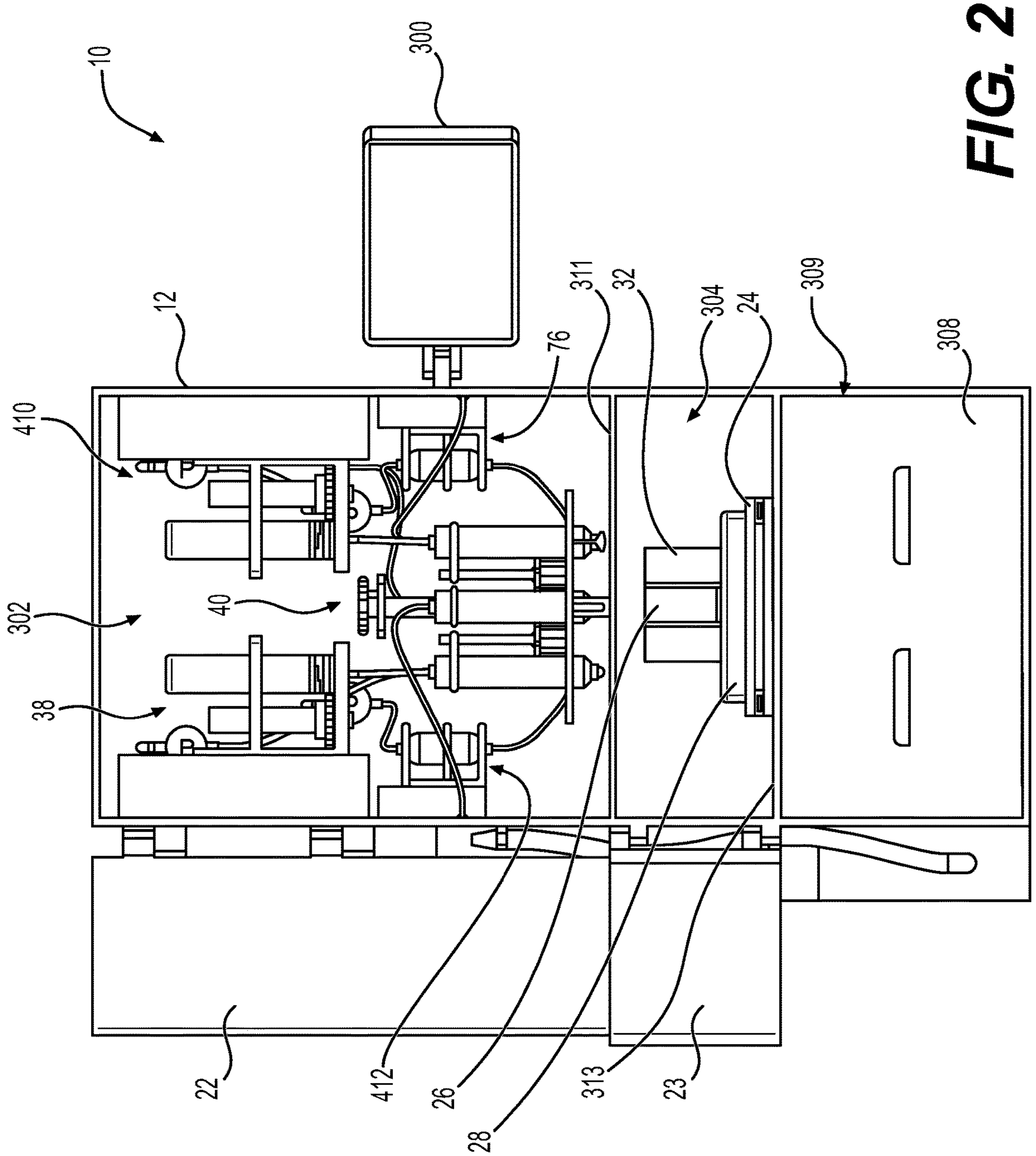
FIG. 2 is a front view of the system for making suspensions.
Figure 7:
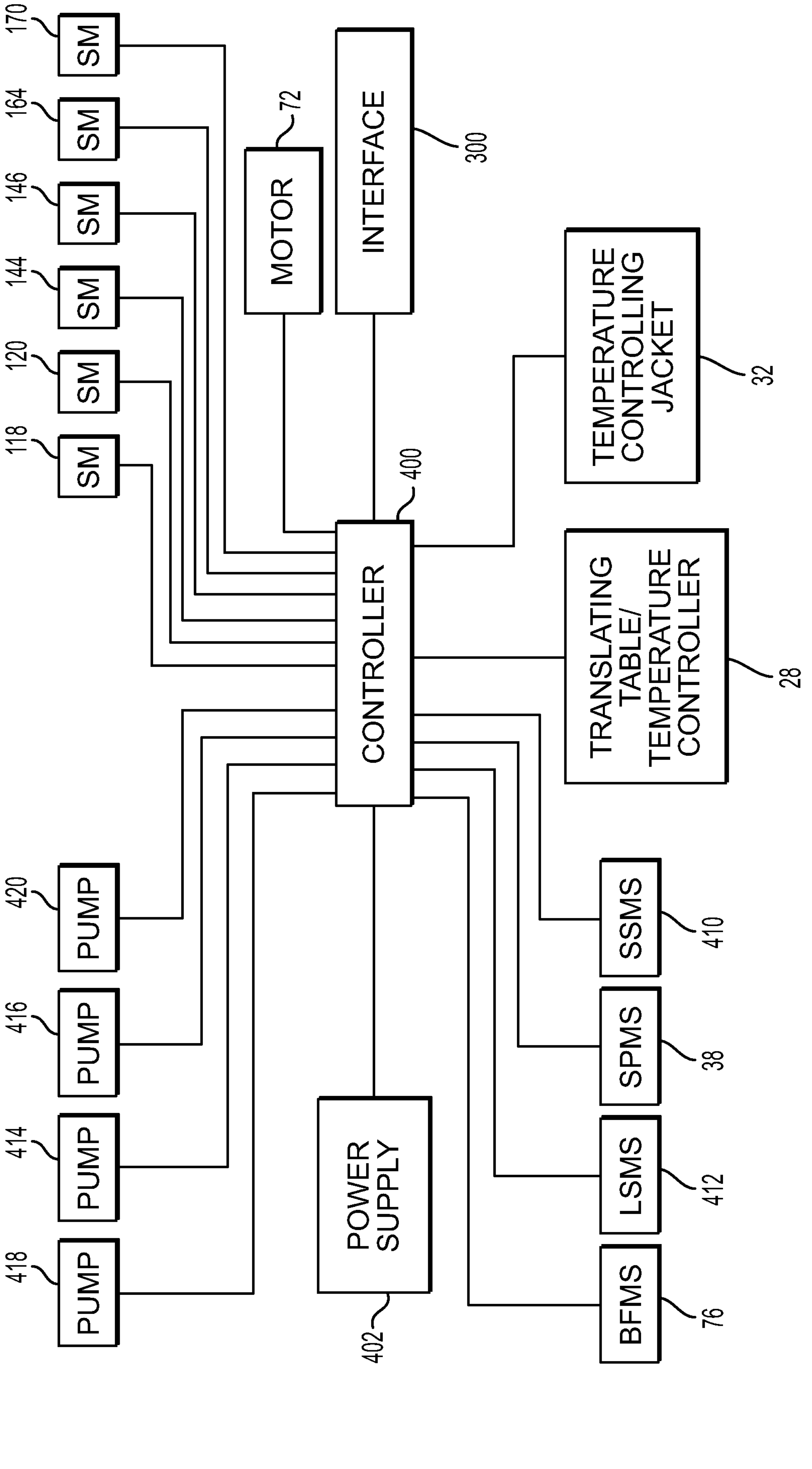
FIG. 7 is a block diagram showing components of the system for making suspensions.

The system for making suspensions 10 is an automated system for the controlled preparation of solid-in-liquid suspensions. As shown in FIGS. 1A, 1B, 1C and 2, the system for making suspensions 10 includes a housing 12 which has a base 16, an upper wall 20, at least one sidewall 14 and an open front 18. It should be understood that the overall rectangular shape and relative dimensions of housing 12 seen in FIGS. 1A, 1B, 1C and 2 are shown for exemplary purposes only. A platform 24 is mounted within the housing 12, and a translating table 28 is slidably mounted on the platform 24 for removably supporting a receptacle 26. The translating table 28 may be, or may include, a temperature-controlling plate for controlling a temperature of the receptacle 26 from the receptacle's bottom end. An additional temperature-controlling jacket 32 may be wrapped around the remainder, or a selected portion, of the receptacle 26. As shown in FIG. 7, the temperature-controlling plate of translating table 28 and the temperature-controlling jacket 32 are in communication with a controller 400, which may be either manually controlled or automatically programmed through a user interface 300, which may be a touchscreen or the like. It should be understood that controller 40 may be any suitable type of controller, such as, but not limited to, a microprocessor, a programmable logic controller, control circuit, a personal computer or the like. Similarly, it should be understood that user interface 300 may be any suitable type of user interface, and that the housing-mounted touchscreen shown in FIGS. 1A-2 is shown for exemplary purposes only.

Figure 4:
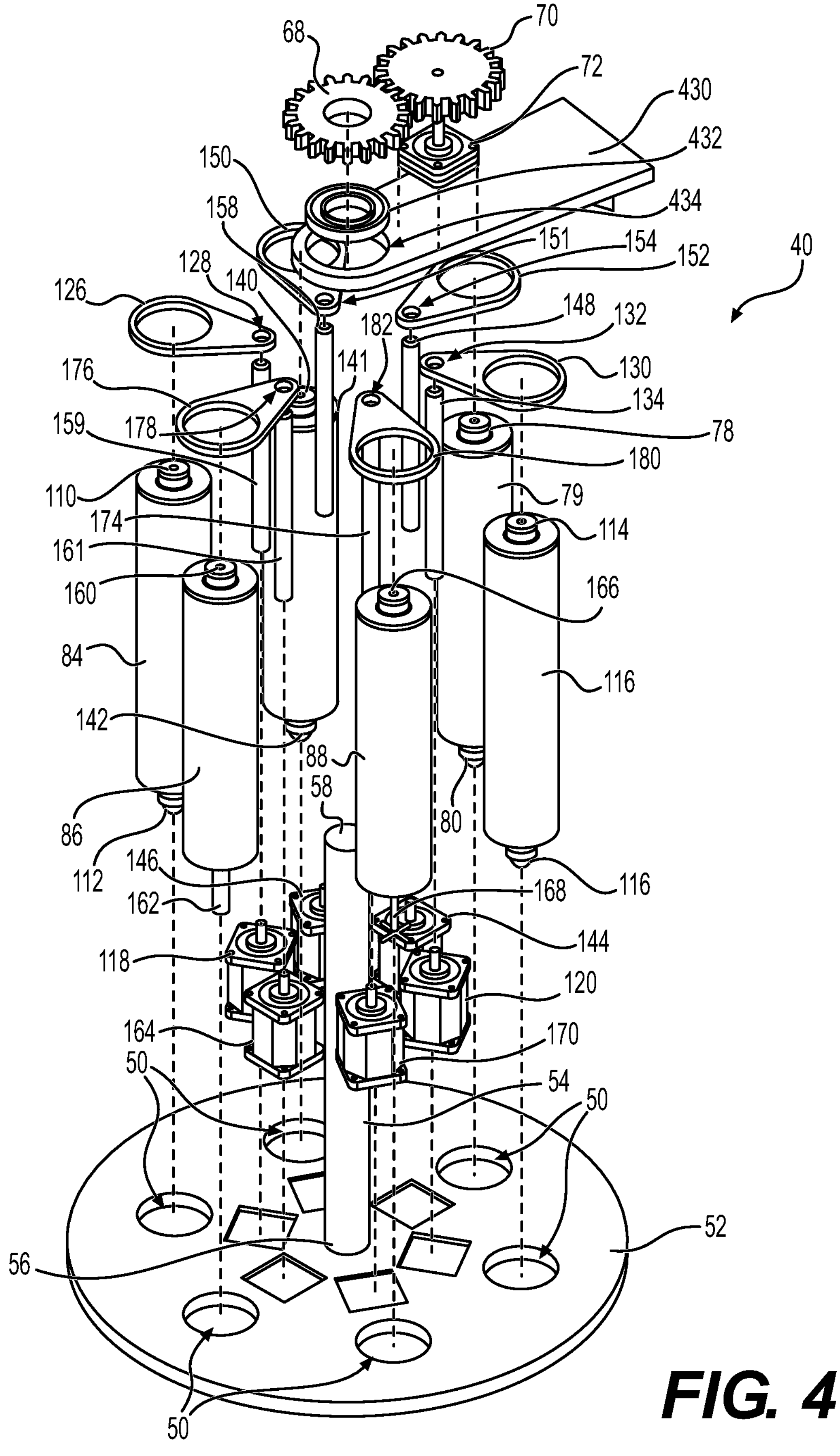
FIG. 4 is a front view of the rotating dispenser.

A rotating dispenser system 40 is mounted within the housing 12, above the platform 24 and the receptacle 26. As will be described in greater detail below, the rotating dispenser system 40 receives at least a base fluid and a quantity of solid particles for making the solid-in-liquid suspensions, which are mixed in receptacle 26. As best shown in FIG. 4, the rotating dispenser 40 includes a base fluid dispenser 84 for selectively dispensing a controlled mass of the base fluid into the receptacle 26, and a solid particle dispenser 115 for selectively dispensing a controlled mass of the solid particles into the receptacle 26. The base fluid dispenser 84 is in fluid communication with a base fluid tank 36, and the solid particle dispenser is in communication with a solid particle container 100, as will be discussed in greater detail below. A mixer is provided for selectively and controllably mixing the controlled mass of the base fluid and the controlled mass of the solid particles in the receptacle 26 to form the suspension, as will also be discussed in greater detail below.

The rotating dispenser system 40 includes a rotating plate 52 having a plurality of openings 50 formed therethrough. Each of the base fluid dispenser 84 and the solid particle dispenser 115 includes a nozzle assembly slidably received within a corresponding one of the openings 50. A lower end 112 of the base fluid dispenser 84 projects through the corresponding opening 50. Similarly, the lower end 116 of the solid particle dispenser also projects through its corresponding opening 50. A lower end 56 of an axle 54 is secured to the rotating plate 52. As further seen in FIG. 4, a first gear 68 is coupled to the upper end 58 of the axle 54, and a second gear 70 engages the first gear 68 to drive rotation thereof. The second gear 70 is coupled to a motor 72 to drive rotation of the second gear 70. A plate 430 is mounted to the at least one sidewall 14 of the housing 12 for supporting the gears 68, 70 and the motor 72, and for providing stability to the axle 54. Plate 430 has an opening 434 formed therethrough for receiving the upper end 58 of axle 54 for connection to the first gear 68. As shown, an additional bearing 432 may be provided for stably and rotatably receiving the upper end 58 of axle 54.

First and second stepper motors 118, 120 are mounted on the rotating plate 52 respectively adjacent to the base fluid dispenser 84 and the solid particle dispenser 115. First and second threaded rods 159, 134 are respectively driven to rotate by the first and second stepper motors 118, 120. First and second nozzle assembly holders 126, 130 are respectively secured to the respective upper ends 110, 114 of the base fluid dispenser 84 and the solid particle dispenser 115. The first nozzle assembly holder 126 has a threaded opening 128 formed therethrough for receiving a portion of the first threaded rod 159. Similarly, the second nozzle assembly holder 130 has a threaded opening 132 formed therethrough for receiving a portion of the second threaded rod 134. Thus, as the first and second threaded rods 159, 134, respectively, are driven to rotate by their respective stepper motors 118, 120, the base fluid dispenser 84 and the solid particle dispenser 115 can be moved up and down, in a controlled manner, through their corresponding openings 50. This vertical movement can be used to initiate or cease dispensing, as well as bringing the desired dispenser in closer proximity to the receptacle 26. The particular dispenser being used at any given time is positioned above the receptacle 26 through operation of the motor 72, which rotates the rotating plate 52. As shown in FIG. 7, the motor 72 is in communication with the controller 400, which may be either manually controlled or automatically programmed through the user interface 300. Similarly, the first and second stepper motors (SMs) 118, 120 are also in communication with controller 400 for controlling the actuation thereof.

The rotating dispenser system 40 may also include a liquid surfactant dispenser 79 in fluid communication with a liquid surfactant tank 74 for selectively dispensing a controlled mass of the liquid surfactant into the receptacle 26, and a solid surfactant dispenser 141 in communication with a solid surfactant container for selectively dispensing a controlled mass of a solid surfactant into the receptacle 26, as will be discussed in greater detail below. Similar to the base fluid dispenser 84 and the solid particle dispenser 115, each of the liquid surfactant dispenser 79 and the solid surfactant dispenser 141 includes a nozzle assembly slidably received within a corresponding one of the openings 50 formed through the rotating plate 52.

Third and fourth stepper motors 144, 146, are mounted on the rotating plate 52 respectively adjacent to the liquid surfactant dispenser 79 and the solid surfactant dispenser 141, and third and fourth threaded rods 148, 158 are respectively driven to rotate by the third and fourth stepper motors 144, 146. Third and fourth nozzle assembly holders 152, 150 are respectively secured to the respective upper ends 78, 140 of the liquid surfactant dispenser 79 and the solid surfactant dispenser 141. Each of the third and fourth nozzle assembly holders 152, 150 has a respective threaded opening 154, 151 formed therethrough for respectively receiving a portion of the third and fourth threaded rods 148, 158. Thus, the liquid surfactant dispenser 79 and the solid surfactant dispenser 141 may be moved and controlled in a manner similar to the base fluid dispenser 84 and the solid particle dispenser 115.

The mixer may include both a sonicator 86 and a homogenizer 88. As shown in FIG. 4, each of the sonicator 86 and the homogenizer 88 is slidably received within a corresponding one of the openings 50 formed through the rotating plate 52. Fifth and sixth stepper motors 164, 170, respectively, are mounted on the rotating plate 52 respectively adjacent to the sonicator 86 and the homogenizer 88, and fifth and sixth threaded rods 161, 174 are respectively driven to rotate by the fifth and sixth stepper motors 164, 170. Sonicator and homogenizer holders 176, 180, respectively, are respectively secured to the respective upper ends 160, 166 of the sonicator 86 and the homogenizer 88. Each of the sonicator and homogenizer holders 176, 180 has a respective threaded opening 178, 182 formed therethrough for respectively receiving a portion of the fifth and sixth threaded rods 161, 174. Thus, the desired sonicator 86 or homogenizer 88 may be lowered into the receptacle 26 in a manner similar to that of the movement of the base fluid dispenser 84 and the solid particle dispenser 115. As shown in FIG. 7, the third, fourth, fifth and sixth stepper motors (SMs) 144, 146, 164, 170 are also in communication with controller 400 for controlling the actuation thereof.

Figure 3:
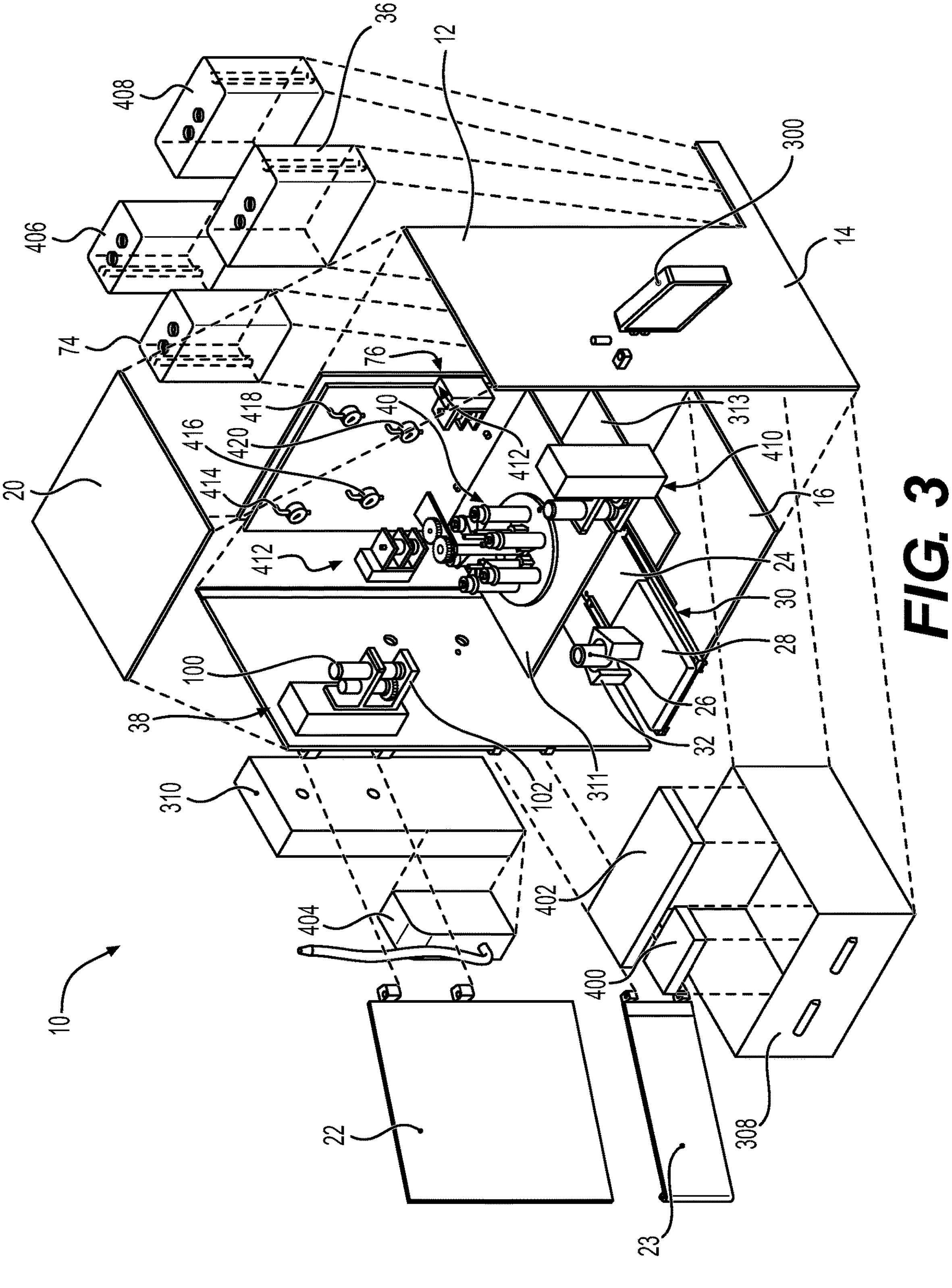
FIG. 3 is an exploded view of the system for making suspensions.

As best seen in FIGS. 1A and 2, the housing 12 may be separated into upper, middle and lower compartments 302, 304, 309, respectively, such that the platform 24 and the receptacle 26 are received within the middle compartment 304, and the rotating dispenser system 40 is received within the upper compartment 302. As shown in FIGS. 2 and 3, a first shelf 311 may be used to separate the upper compartment 302 from the middle compartment 304, with the rotating plate 52 rotatably supported on the first shelf 311. The first shelf 311 may have one or more openings formed therethrough, allowing the dispensers and mixer to extend into the middle compartment 304. A second shelf 313 separates the middle compartment 304 from the lower compartment 309, with the platform 24 resting on the second shelf 313. A sliding drawer 308 may be received in the lower compartment 309. As shown in FIG. 3, the controller 400 and an associated power supply 402 may be received within sliding drawer 308. It should be understood that any additional electronics, such as buses, connectors, adapters or the like, may also be received within sliding drawer 308. Upper and middle doors 22, 23, respectively, may be pivotally secured to the at least one sidewall 114 for releasably covering the upper and middle compartments 302, 304, respectively. Middle door 23 may be transparent, allowing the user to easily visually monitor the preparation of the suspension in receptacle 26.

Figure 5A:
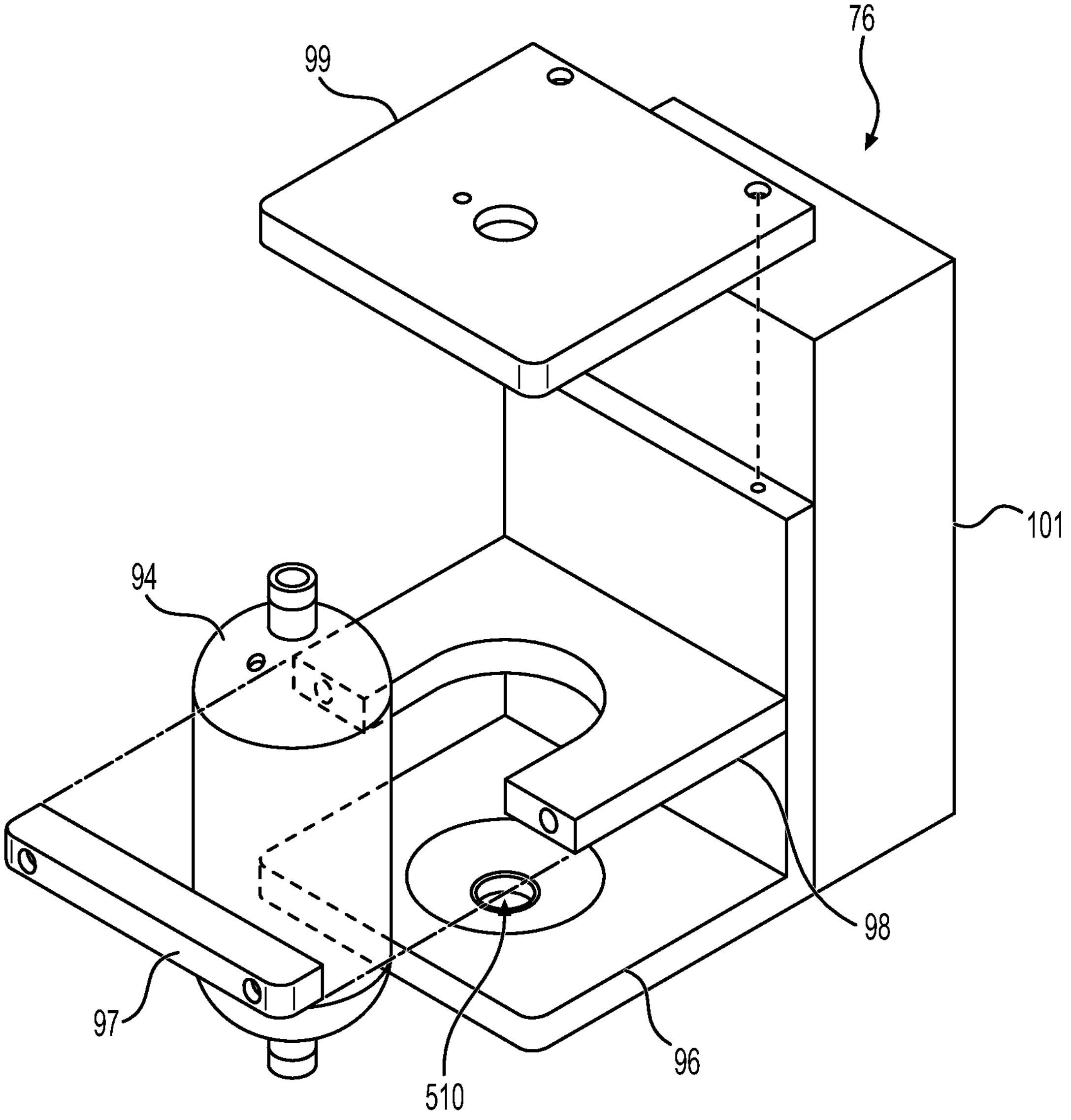
FIG. 5A is a perspective view of the base fluid metering system.
Figure 5B:
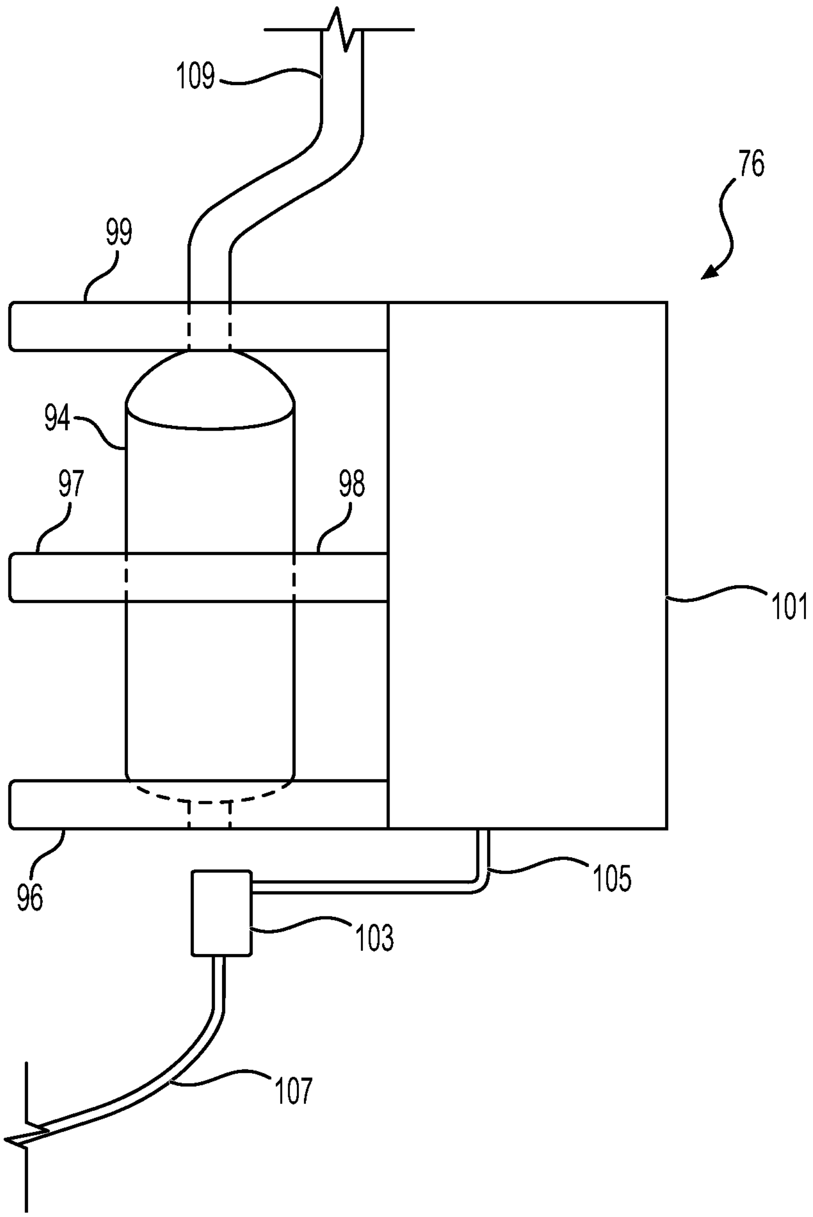
FIG. 5B is a side view of the base fluid metering system.

For metering the base fluid, a base fluid receptacle 94 may be in fluid communication with the base fluid tank 36. As shown in FIGS. 5A and 5B, the base fluid metering system 76 includes the base fluid receptacle 94 and a base fluid scale 96 for measuring a mass of the base fluid in the base fluid receptacle 94. A pump 420 may be used to controllably drive the base fluid from base fluid tank 36 to the base fluid receptacle 94. For purposes of illustration and simplification, tubes or other fluid-carrying conduits are not shown in FIG. 4, however, it should be understood that the base fluid may flow from the base fluid tank 36 to the base fluid receptacle 94 through any suitable type of tubes, pipes, conduits or the like.

As best seen in FIG. 5B, an upper holder 99 and a middle holder 98 are mounted on a housing 101 for holding and stabilizing the base fluid receptacle 94. A removable bar 97 may be removably attached to the front of the middle holder 98, as shown in FIG. 5A, allowing the base fluid receptacle 94 to be easily removed for cleaning. Housing 101 is mounted on the inner face of the at least one sidewall 14, and may contain any necessary electronic or fluid control components.

Returning to FIG. 5B, a fluid receiver 103 is positioned beneath the base fluid receptacle 94 and the base fluid scale 96 for receiving the controlled mass of the base fluid. As shown in FIG. 5A, the base fluid scale 96 has an opening 510 formed therethrough, allowing the fluid to flow into the fluid receiver 103 from the base fluid receptacle 94. The base fluid receiver 103 is in fluid communication with the base fluid dispenser 84 through tube 107. It should be understood that support 105 is shown in FIG. 5B for exemplary purposes only, and that the base fluid receiver 103 may be held beneath base fluid scale 96 using any suitable type of mounting structure. In use, pump 420 pumps the base fluid from the base fluid tank 36 to the base fluid receptacle 94 through a tube 109 or the like. The initial weight of the base fluid receptacle 94 is measured by base fluid scale 96. The dispensing of base fluid into the base fluid receiver 103 may be controlled using any suitable type of valve or the like. The amount of base fluid being dispensed into the base fluid receiver 103 is determined by constant real-time monitoring of the weight of base fluid receptacle 94. Once a desired mass of base fluid has been received by base fluid receiver 103, the dispensing of the base fluid is halted. An identical system 412 for delivering the liquid surfactant from a liquid surfactant tank 74, via pump 416, to the liquid surfactant dispenser 79 may also be used. As shown in FIG. 7, each of the base fluid metering system (BFMS) 76 and the liquid surfactant metering system (LSMS) 412 may be under the control of controller 400. In addition to the base fluid and the liquid surfactant, distilled water may also be provided, as needed, from a distilled water tank 406 through a pump 414. As a non-limiting example, the distilled water may be used to clean the tubing within system 10. Further, a liquid discharge tank 408 may also be provided for removing excess or waste fluids via a pump 418.

Figure 6A:
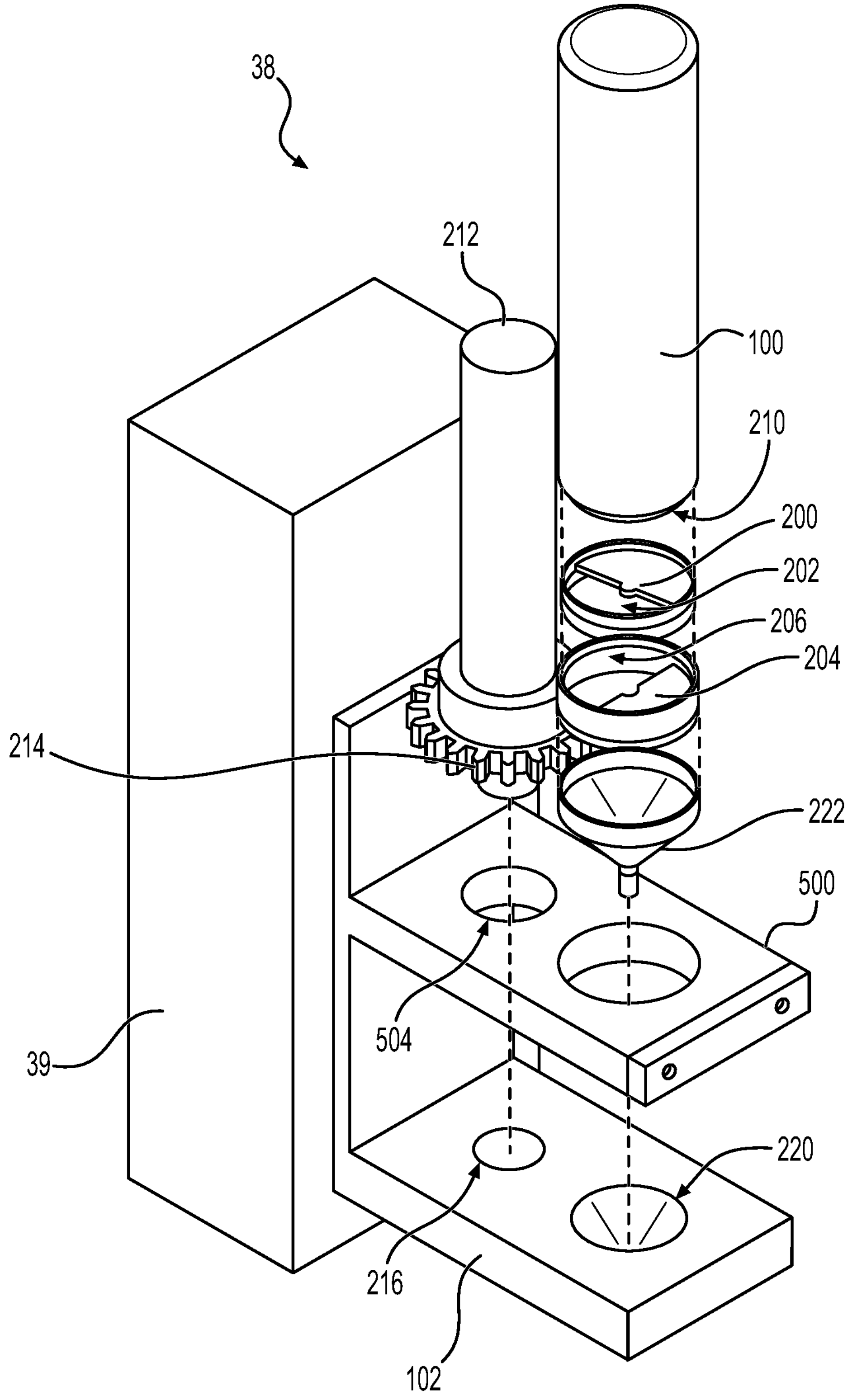
FIG. 6A is a perspective view of a solid particle metering system.
Figure 6B:
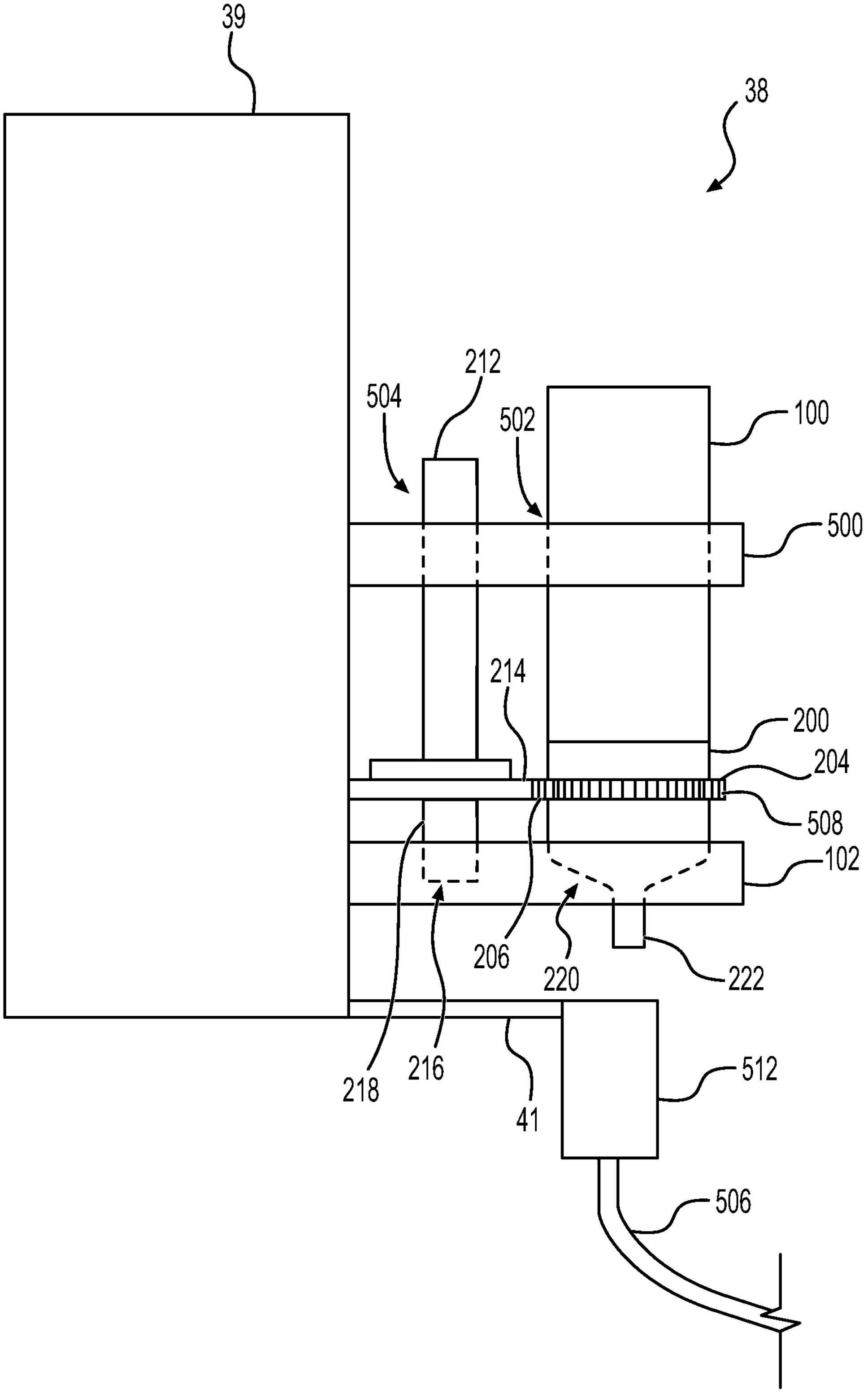
FIG. 6B is a side view of a solid particle metering system.

Similarly, for metering the solid particles, a solid particle scale 102 may be provided for measuring a mass of the solid particles in a solid particle container 100. As shown in FIGS. 6A and 6B, a solid particle metering system 38 includes a housing 39, mounted on the inner face of the at least one sidewall 14, and may contain any necessary electronic or solid particle control components. A holder 500 has openings 502 and 504 formed therethrough, and is mounted to housing 39. The solid particle container 100 is releasably held within opening 504. A solid particle receiver 512 is positioned beneath the solid particle container 100 and the solid particle scale 102 for receiving the controlled mass of the solid particles. The solid particle receiver 512 is in communication with the solid particle dispenser 115 through tube 506. As shown in FIG. 6B, the solid particle scale 102 has an open recess 220 formed therein for receiving a funnel 222. The solid particles flow from the funnel into the solid particle receiver 512. It should be understood that support 41 is shown in FIG. 6B for exemplary purposes only, and that the solid particle receiver 512 may be held beneath solid particle scale 102 using any suitable type of mounting structure.

In order to control the delivery of the solid particles, a cap 200 may be provided for covering an open lower end 210 of the solid particle container 100, where the cap has a first opening 202 formed therethrough. A rotating disc 204 is mounted beneath the cap 200, and the rotating disc 204 has a second opening 206 formed therethrough. In order to dispense the solid particles from the solid particle container 100, the rotating disc 204 is rotated such that the second opening 206 aligns with the first opening 202 formed through the cap 200. To control this dispensing, the rotating disc 204 has teeth 508 peripherally formed thereon for engaging a gear 214, which is selectively and controllably driven to rotate by a stepper motor 212. As shown, the stepper motor 212 may be held in place by passing the body thereof through opening 504 of holder 500, and receiving a lower end 218 thereof within a recess 216 formed in solid particle scale 102.

In use, the initial weight of the solid particle container 100 (along with the attached cap 200, rotating disc 204, and funnel 222) is measured by solid particle scale 102. The dispensing of the solid particles is initiated through the driven alignment of first opening 202 with second opening 206. The mass of solid particles dispensed into the solid particle receiver 512 is determined by constant real-time monitoring of the weight of solid particle container 100 (along with the attached cap 200, rotating disc 204, and funnel 222). Once a desired mass of solid particles has been received by solid particle receiver 512, the dispensing of the solid particles is halted. An identical system 410 for delivering the solid surfactant to the solid surfactant dispenser 141 may also be used. As shown in FIG. 7, each of the solid particle metering system (SPMS) 38 and the solid surfactant metering system (SSMS) 410 may be under the control of controller 400.

In use, the user enters the desired mass or volume of each component of the suspension into the user interface 300. As each component has a known density, the controller 400 can calculate the desired mass to be dispensed based on any volume which may be entered. It should be understood that any suitable additional environmental or utility equipment may also be mounted to or within the housing 12. As non-limiting examples, a dehumidifier 310 and a cleaning system 404 may be mounted on the housing 12, as shown in FIG. 3. As a non-limiting example, cleaning system 404 may be a vacuum cleaner for removing any spilled powder inside housing 12.

It is to be understood that the system for making suspensions is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A system for making suspensions, comprising:
- a housing having a base, an upper wall, at least one sidewall and an open front;
- a platform mounted within the housing for removably supporting a receptacle;
- a base fluid tank for storing a base fluid;
- a solid particle container for storing solid particles;
- a translating table slidably mounted on the platform;
- a rotating dispenser system mounted within the housing above the platform and the receptacle, the rotating dispenser comprising a base fluid dispenser for selectively dispensing a controlled mass of the base fluid into the receptacle, and a solid particle dispenser for selectively dispensing a controlled mass of the solid particles into the receptacle, wherein the base fluid dispenser is in fluid communication with the base fluid tank, and the solid particle dispenser is in communication with the solid particle container; and
- a mixer for selectively and controllably mixing the controlled mass of the base fluid and the controlled mass of the solid particles in the receptacle to form a suspension.

2. The system for making suspensions as recited in claim 1, further comprising at least one door pivotally mounted to the at least one sidewall for releasably covering the open front of the housing.

3. The system for making suspensions as recited in claim 1, wherein the translating table comprises a temperature-controlling plate.

4. The system for making suspensions as recited in claim 1, further comprising a temperature-controlling jacket for receiving the receptacle and controlling the temperature thereof.

5. The system for making suspensions as recited in claim 1, wherein the rotating dispenser system further comprises:
- a rotating plate having a plurality of openings formed therethrough, wherein each of the base fluid dispenser and the solid particle dispenser comprises a nozzle assembly slidably received within a corresponding one of the openings, and wherein each of the base fluid dispenser and the solid particle dispenser has opposed upper and lower ends;
- an axle having opposed lower and upper ends, the lower end thereof being secured to the rotating plate;
- a first gear coupled to the upper end of the axle;
- a motor;
- a second gear coupled to the motor, the second gear engaging the first gear to drive rotation thereof;
- first and second stepper motors mounted on the rotating plate respectively adjacent to the base fluid dispenser and the solid particle dispenser;
- first and second threaded rods being respectively driven to rotate by the first and second stepper motors; and
- first and second nozzle assembly holders respectively secured to the respective upper ends of the base fluid dispenser and the solid particle dispenser, wherein each of the first and second nozzle assembly holders has a threaded opening formed therethrough for respectively receiving a portion of the first and second threaded rods.

6. The system for making suspensions as recited in claim 5, further comprising:
- a liquid surfactant tank for storing a liquid surfactant; and
- a solid surfactant container for storing a solid surfactant.

7. The system for making suspensions as recited in claim 6, wherein the rotating dispenser system further comprises:
- a liquid surfactant dispenser in fluid communication with the liquid surfactant tank for selectively dispensing a controlled mass of the liquid surfactant into the receptacle;
- a solid surfactant dispenser in communication with the solid surfactant container for selectively dispensing a controlled mass of the solid surfactant into the receptacle, wherein each of the liquid surfactant dispenser and the solid surfactant dispenser comprises a nozzle assembly slidably received within a corresponding one of the openings formed through the rotating plate, and wherein each of the liquid surfactant dispenser and the solid surfactant dispenser has opposed upper and lower ends;
- third and fourth stepper motors mounted on the rotating plate respectively adjacent to the liquid surfactant dispenser and the solid surfactant dispenser;
- third and fourth threaded rods being respectively driven to rotate by the third and fourth stepper motors; and
- third and fourth nozzle assembly holders respectively secured to the respective upper ends of the liquid surfactant dispenser and the solid surfactant dispenser, wherein each of the third and fourth nozzle assembly holders has a threaded opening formed therethrough for respectively receiving a portion of the third and fourth threaded rods.

8. The system for making suspensions as recited in claim 7, wherein the mixer comprises a sonicator and a homogenizer.

9. The system for making suspensions as recited in claim 8, wherein each of the sonicator and the homogenizer is slidably received within a corresponding one of the openings formed through the rotating plate, and wherein each of the sonicator and the homogenizer has opposed upper and lower ends, and wherein the rotating dispenser system further comprises:
- fifth and sixth stepper motors mounted on the rotating plate respectively adjacent to the sonicator and the homogenizer;

fifth and sixth threaded rods being respectively driven to rotate by the third and fourth stepper motors; and sonicator and homogenizer holders respectively secured to the respective upper ends of the sonicator and the homogenizer, wherein each of the sonicator and homogenizer holders has a threaded opening formed therethrough for respectively receiving a portion of the fifth and sixth threaded rods.

10. The system for making suspensions as recited in claim 7, further comprising:

a base fluid receptacle in fluid communication with the base fluid tank;

a base fluid scale for measuring a mass of the base fluid in the base fluid receptacle;

a fluid receiver positioned beneath the base fluid receptacle and the base fluid scale for receiving the controlled mass of the base fluid, the base fluid receiver being in fluid communication with the base fluid dispenser;

a solid particle scale for measuring a mass of the solid particles in the solid particle container;

a solid particle receiver positioned beneath the solid particle container and the solid particle scale for receiving the controlled mass of the solid particles, the solid particle receiver being in communication with the solid particle dispenser.

11. The system for making suspensions as recited in claim 10, further comprising:

a cap for covering an open lower end of the solid particle container, the cap having a first opening formed therethrough;

a rotating disc mounted beneath the cap, the rotating disc having a second opening formed therethrough, the rotating disc having teeth peripherally formed thereon;

a stepper motor; and a gear selectively and controllably driven by the stepper motor, the gear engaging the teeth of the rotating disc.

12. The system for making suspensions as recited in claim 10, further comprising:

a liquid surfactant receptacle in fluid communication with the liquid surfactant tank and the liquid surfactant dispenser;

a liquid surfactant scale for measuring a mass of the liquid surfactant in the liquid surfactant receptacle, the controlled mass of the liquid surfactant being received by the liquid surfactant dispenser from the liquid surfactant receptacle; and a solid surfactant scale for measuring a mass of the solid surfactant in the solid surfactant container, the controlled mass of the solid surfactant being received by the solid surfactant dispenser from the solid surfactant container.

13. The system for making suspensions as recited in claim 1, wherein the housing is separated into upper, middle and lower compartments, and wherein the platform and the receptacle are received within the middle compartment, and the rotating dispenser system is received within the upper compartment.

14. The system for making suspensions as recited in claim 13, further comprising upper and middle doors each pivotally secured to the at least one sidewall for releasably respectively covering the upper and middle compartments.

15. The system for making suspensions as recited in claim 14, further comprising a drawer slidably received within the lower compartment.

16. The system for making suspensions as recited in claim 1, further comprising a dehumidifier mounted on the housing.

* * * * *